INVENTORS
KENNETH F. BECKER, LEROY D. TAYLOR, WALTER J. ZOYA

ATTORNEYS

United States Patent Office 3,521,653
Patented July 28, 1970

3,521,653
POWER TRANSMISSION
Kenneth F. Becker, Clarkston, Le Roy D. Taylor, Rochester, and Walter J. Zoya, Troy, Mich., assignors to Sperry Rand Corporation, Troy, Mich., a corporation of Delaware
Filed Dec. 13, 1967, Ser. No. 690,176
Int. Cl. F15c *1/04, 3/06*
U.S. Cl. 137—81.5     2 Claims

ABSTRACT OF THE DISCLOSURE

A fluid directional control device having in combination a fluid amplifier for directing fluid flow to one of a plurality of fluid outlets and a movable ball element which is responsive to pressure acting thereon to prevent fluid flow from exhausting from the other of said plurality of fluid outlets when said fluid flow is exhausted from said one outlet.

BACKGROUND OF THE INVENTION

This invention relates to power transmissions, particularly to those of the type comprising two or more fluid pressure energy translating devices, one of which may function as a fluid pump and another as a fluid motor.

This invention is generally concerned with a directional control valve mechanism for controlling the direction of fluid in such transmission systems. In particular, this invention relates to a unique valving mechanism which is a fluidic-mechanical design concept exhibiting the functional reliability and simplicity of a pure fluid system with the positive shut-off characteristics typical of mechanical systems.

Specifically, this invention relates to a fluidic mechanical control thrust assembly which selectively directs extremely high temperature gas to any of a plurality of thrust nozzles.

In the past, it has been customary to use in such high temperature gas directional control systems a pilot operated directional control valve which is generally designed to direct flow to one of two rocket nozzles. In present day missile applications, four such rocket nozzles may be circumferentially spaced around the outer periphery of the missile and used to obtain proper guidance for the missile direction, thus, two separate control valves are required—one for each pair of nozzles. An effective control of the missile direction may be obtained by employing three nozzles, however, two directional control valves would still be required to selectively control the flow of gas to the rocket nozzles.

The control valves used in the past have functioned in an acceptable manner, however, they employ sliding elements which require a close clearance sliding fit which is sensitive to propellant contamination and may lead to possible damage or seizure of the sliding elements. Such valves require the use of a propellant filter, thus adding undesirable weight to the vehicle.

In addition, such valves are designed such that the pilot control flow and internal leakage are exhausted overboard, thus increasing the total system volumetric losses.

Further, such missile applications have a limited amount of electrical power available for use, thus, employing a thrust assembly valving system which requires a plurality of control valves, reduces the effective electrical power available.

It has been suggested that missile control may be obtained by utilizing a flow control valving system which is comprised of pure fluidic devices, however, such a pure fluidic system is not adaptable for such a use, since fluidic systems do not provide the required low leakage characteristics of a positive shut-off mechanical type valve.

SUMMARY

This invention comprises a combination of a fluid amplifier and a pressure responsive mechanical element in which flow may be exhausted from one leg of said amplifier while the flow from the other leg of said amplifier is substantially shut off It is therefore an object of this invention to provide a unique and improved fluidic mechanical device for directing the flow of fluid and which provides the low leakage characteristics of a positive shut-off mechanical type valve.

It is also an object of this invention to provide a directional control valve in which all pilot control flow and internal leakage is collected and utilized for the output.

It is aso an object of this invention to provide a directional control valve having no close clearance sliding fits, thus minimizing damage and possible seizure.

It is also a purpose of this invention to provide a directional control valve which is completely insensitive to propellant contamination.

It is also a purpose of this invention to provide an electrically actuated directional control valve which may selectively direct fluid flow from an inlet to a plurality of fluid outlets and which has a minimum electrical power consumption.

It is a further purpose of this invention to provide a directional control valve which may selectively direct fluid flow from an inlet to a plurality of fluid outlets, which is compact, and economical to manufacture, and which is reliable in operation over a long life.

Further objects and advantages of the present invention will be apparent from the following description, reference being had to the accompanying drawings wherein a preferred form of the invention is clearly shown.

IN THE DRAWINGS

Figure 1:
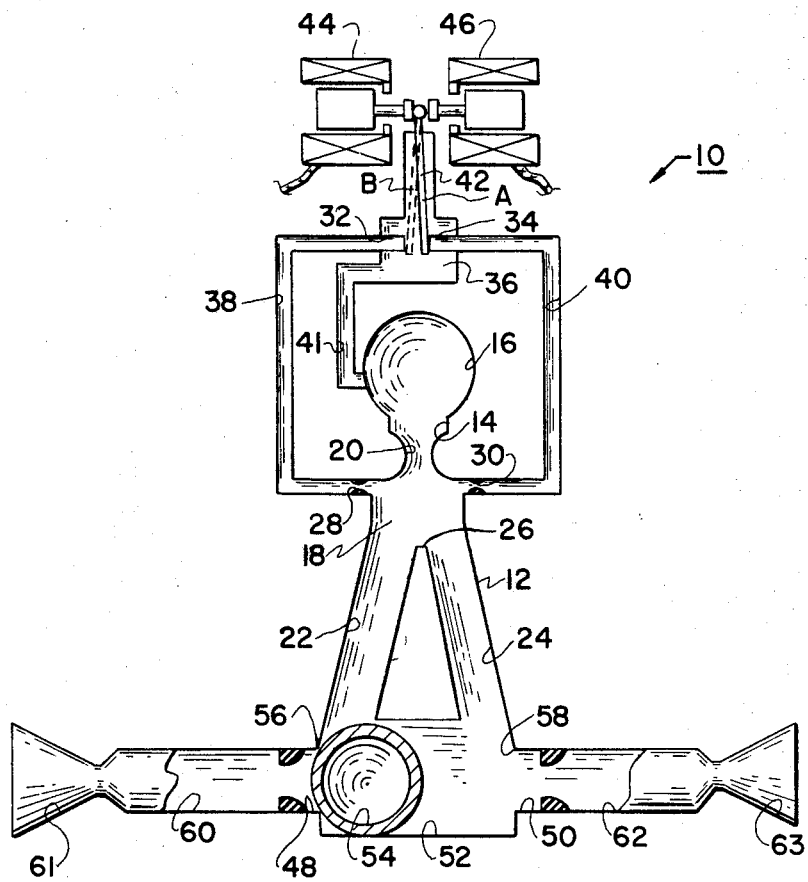
FIG. 1 is a diagrammatic view of a directional control valve incorporating a preferred form of the present invention.

Referring now to the drawings, and especially FIG. 1, the directional control valve 10 of the present invention has a pure fluid logic device 12 having a power stream input channel 14 connecting an inlet chamber 16 to an interaction chamber 18 by means of sonic (or supersonic) venturi 20, which defines a fluid power stream emanating from venturi 20 into the interaction chamber 18. The other extremity of the inlet chamber 16 is connected to a pressure fluid source such as the propellant exhaust of a missile rocket engine, not shown. First and second diverging output channels 22 and 24 also communicate with the interaction chamber 18 and define first and second output paths of fluid flow, respectively. The output channels 22 and 24 diverge from a common wedge 26 disposed therebetween, which is preferably truncated and forms one wall of the interaction chamber 18. The other walls of the interaction chamber 18 may be formed by extensions of the exterior walls of the output channels 22 and 24. The device 12 has a left control jet nozzle 28 and a right control jet nozzle 30 which communicate with the interaction chamber 18 at one extremity, and are connected, respectively, to left and right feed back control ports 32 and 34 in a servo valve chamber 36 by means of conduits 38 and 40, respectively. The servo valve chamber 36 is connected to the inlet chamber 16 by means of conduit 41, thus, both chambers 16 and 36 are substantially at the same pressure.

The pressure fluid in chamber 36 may be selectively directed to either left and right feedback control ports 32 and 34 by means of a leaf type flapper 42 which is mechanically linked and actuated by solenoids 44 and 46. When the solenoids are actuated so as to shift the flapper 42 rightwardly, as illustrated by the letter "A," the pressure fluid entering the right feedback control port 34 is substantially restricted, thus pressure fluid in chamber 36 will exit through the left feedback control port 32 and be directed to the interaction chamber 18 via conduit 38 and left jet nozzle 28. When the solenoids are actuated so as to shift the flapper 42 leftwardly, as illustrated by the letter "B," the pressure fluid entering the left feedback control port 32 is substantially restricted, thus, pressure fluid in the chamber 36 will exit through the right feedback control port 34 and be directed to the interaction chamber 18 via conduit 40 and right jet nozzle 30.

Pure fluid device 12, as described, may be constructed according to any of the methods known to those skilled in the art. The device 12 may be of the momentum exchange type, wherein the power stream is deflected by one of the control jet nozzles which directs pressure fluid laterally at the power stream. This device is accordingly sometimes referred to as a proportional, or analog, device. A second, and preferable, type of device which may be used is generally known as a boundary layer, or Coanda effect device. In this latter device, the power jet is deflected by the action of side walls of an interaction chamber which are shaped in such a way that the power stream will attach to one or the other of the walls of the output channels, but not both of the walls. This type of device is basically a two position device, and for this reason is referred to as a digital device. Although the digital is preferred, both the anlog and digital type of device can be employed in combination with the subject invention.

Thus, when pressure fluid is directed through the left control jet nozzle 28 into the interaction chamber 18, the power stream will be directed through the flow path defined by channel 24, and when pressure fluid is directed through the right control jet nozzle 30 into the interaction chamber 18, the power stream will be directed through the flow path defined by the channel 22. Thus, the power stream may be selectively directed to either output channel 22 or 24 by means of positioning flapper 42.

Associated with the output channels 22 and 24 are fluid outlets 48 and 50, respectively, which are connected to each other by means of a channel 52. The channel 52 is in fluid communication with each of the output channels 22 and 24. Movably mounted in channel 52 is a hollow ball member 54 which is responsive to the pressure acting thereon to move within channel 52 to engage either valve seat 56 or valve seat 58 which are formed in fluid outlets 48 and 50, respectively.

The hollow construction of the ball member will minimize input stress loads on the valve seats 56 and 58 while its low mass construction also enhances the ball members response to the pressures acting thereon. It should be noted that no individual dynamic seals are required in the ball member since the actuation seal between the ball member and the channel 52 is not critical to its operation.

If the flapper 42 is actuated so as to cause the power stream to be directed into the flow path associated with output channel 22 in a manner herebefore described, the power stream will exit through the fluid outlet 48 and be directed to a pressure energy translating device, not shown, for use by the same by means of conduit 60, or, as illustrated, to thrust rocket nozzle 61. Simultaneously, a pressure differential will exist across the ball member 54, the resultant force of which will act on ball member 54 to move it away from the power stream and fluid outlet 48 through channel 52 toward the fluid outlet 50 whereupon the ball member 54 will engage the valve seat 58 to close off fluid communication between the fluid outlet 50 and output channel 24, thus providing a positive shut-off of any leakage entering the channel 24 from the interaction chamber 18. Ball member 54 will remain seated on valve seat 58 as long as the power stream is directed to the fluid outlet 48.

When the flapper 42 is actuated so as to cause the power stream to be directed into the flow path associated with the output channel 24 in a manner herebefore described, the power stream will exit through the fluid outlet 50 and be directed to the said pressure energy translating device by means of conduit 62, or, as illustrated, to rocket nozzle 63. Simultaneously, a pressure differential will exist across the ball member 54, the resultant force of which will act on ball member 54 to move it away from the power stream and fluid outlet 50 through channel 52 to the fluid outlet 48 whereupon the ball member 54 will engage the valve seat 56 to close off fluid communication between the fluid outlet 48 and the output channel 22, thus providing a positive shut-off of any leakage entering the channel 22 from the interaction chamber 18. Ball member 54 will remain seated in valve member 56 as long as the power stream is directed to the fluid outlet 50.

Figure 2:
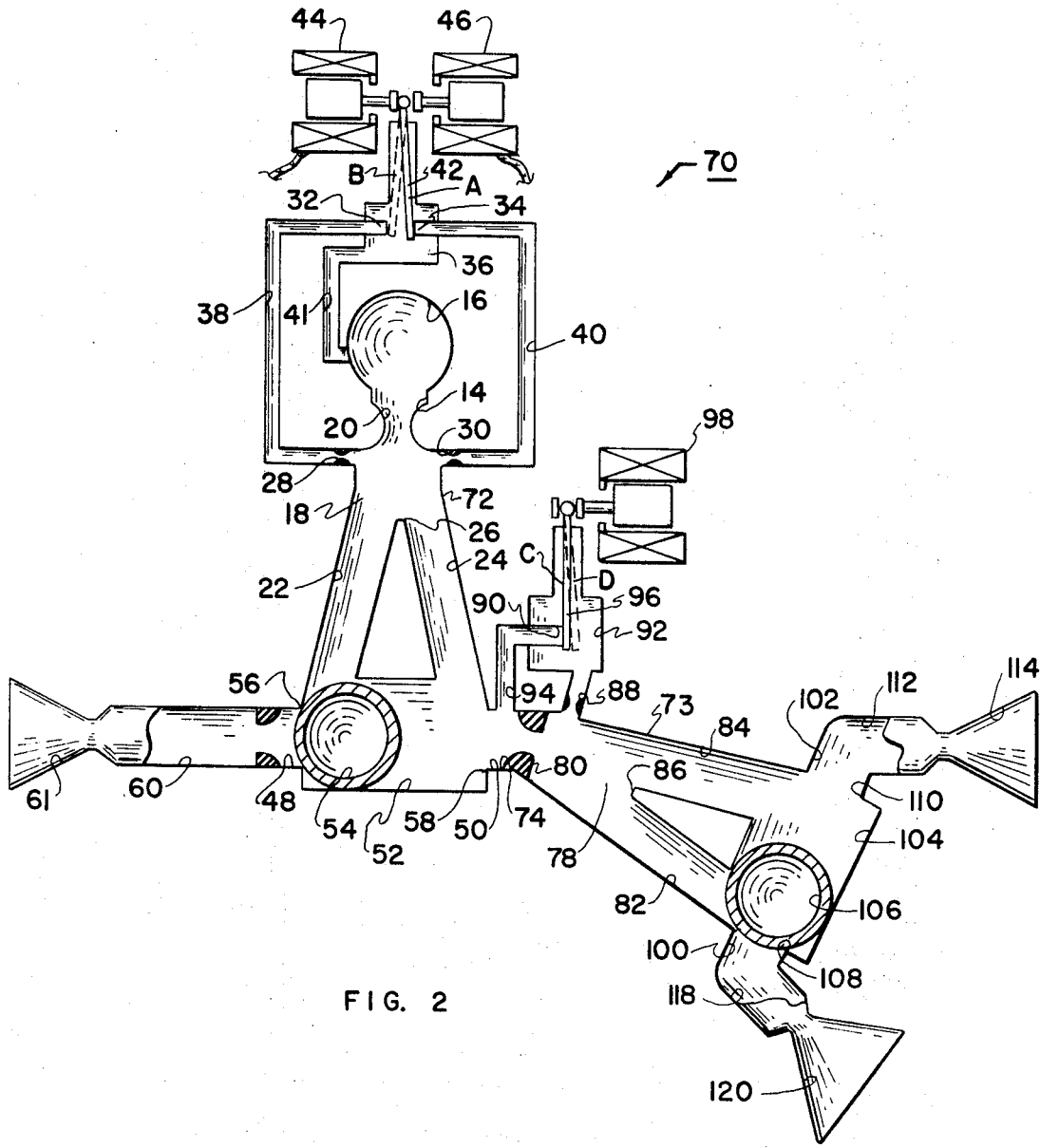
FIG. 2 is a diagrammatic view of another embodiment incorporating a preferred form of the present invention.

Referring now to FIG. 2, there is illustrated another embodiment of the invention. A directional control valve 70 has two pure fluid devices 72 and 73 connected in series.

The pure fluid device 72 has components which are identical to the fluid device 12 herebefore described, and is operated by identical solenoids to function in the same manner as fluid device 12, as herebefore described.

The outlet 50 of the device 72 is a power stream input channel 74 connecting the device 72 to an interaction chamber 78 of device 73 by means of a sonic venturi 80 which defines a fluid power stream emanating from venturi 80 into the interaction chamber 78. Third and fourth output channels 82 and 84 also communicate with the interaction chamber 78 and define first and second output paths of fluid flow, respectively. The output channels 82 and 84 diverge from a common wedge 86 disposed therebetween, which is preferably truncated and forms one wall of the interaction chamber 78. The other walls of the interaction chamber 78 may be formed by the extensions of the exterior walls of the output channels 82 and 84. The device 78 has a control jet nozzle 88 which communicates with the interaction chamber 78 at one extremity and is connected to a feedback control port 90 by means of a servo valve chamber 92. The feedback control port 90 is connected to the power stream input channel 74 beyond the outlet seat 58 by means of conduit 94.

Within the servo chamber 92 there is provided a leaf type flapper 96 which is mechanically linked to and actuated by solenoid 98. When the solenoid 98 is actuated so as to shift the flapper 96 leftwardly, as illustrated by the letter "C," the pressure fluid entering the servo chamber 92 from the feedback control port 90, is substantially restricted, thus, fluid is prevented from entering the interaction chamber 78 via control jet nozzle 88. When the solenoid 98 is actuated so as to shift the flapper 96 rightwardly, as illustrated by the letter "D," pressure fluid may freely enter the servo chamber 92 from the feedback control port 90, and thus into the interaction chamber 78 via control jet nozzle 88.

The device 73 is designed such that the power stream entering the interaction chamber 78 will be directed to the flow path defined by the output channel 84 when the flapper 96 is restricting the feedback control port 90 (position "C") and no flow enters the interaction chamber via control jet nozzle 88 as herebefore described. When the flapper 96 is moved to position "D," and the fluid enters the interaction chamber 78 via control jet nozzle 88 as herebefore described, the power stream will be directed from the input channel 74 to the flow path defined by output channel 82. Thus the power stream may be selectively directed to either input channel 82 or 84 by means of positioning flapper 96.

Pure fluid device 78, as described, may be constructed according to any of the methods known to those skilled in the art. The type of selector of diverter device is commonly known in the art as an OR–NOR gate valve.

Associated with the output channels 82 and 84 are fluid outlets 100 and 102, respectively, which are connected to each other by means of a channel 104. The channel 104 is in fluid communication with each of the output channels 82 and 84. Movably mounted in channel 104 is a hollow ball member 106 which is responsive to pressure acting thereon to move within channel 104 to engage either valve seat 108 or valve seat 110 which are formed on the fluid outlet 100 and 102, respectively. The ball member 104 is identical to ball member 54 and functions in substantially the same manner to prevent communication between the output channel and its associated outlet which is being engaged by the ball member.

For example, if the device 72 is actuated such that the power stream is directed into the path associated with output channel 24 to the outlet 50 and power stream input channel 74 when the flapper 96 is in the "C" position (restricting feedback control port 90), the power stream emanating from the venturi 80 will be directed into the path associated with the output channel 84 and exhausted through outlet 102. The power stream may then be directed to a pressure energy translating device, not shown, for use by the same by means of conduit 112 or, as illustrated, to thrust rocket nozzle 114. Simultaneously, a pressure differential will exist across the ball member 106, the resultant force of which will act on ball member 106 to move it away from the power stream and fluid outlet 102 through channel 104 toward the fluid outlet 100 whereupon the ball member 106 will engage the valve seat 108 formed on outlet 100 to close off fluid communication between the fluid outlet 100 and the output channel 82, thus providing a positive shut-off of any leakage entering the channel 82 from the interaction chamber 78. Ball member 106 will remain seated on valve seat 108 as long as the power stream is directed to the fluid outlet 102.

When the flapper 96 is in the "D" position (permitting free communication between the control jet nozzle 88 and the feedback control port 90 via servo chamber 92) the power stream will be directed into the flow path defined by the output channel 82 and exhausted through outlet 100. The power stream may then be directed to a pressure energy translating device, not shown, for use by the same by means of conduit 118, or, as illustrated, to thrust rocket nozzle 120. Simultaneously, a pressure differential will exist across the ball member 106, the resultant force of which will act on ball member 106 to move it away from the power stream and fluid outlet 100 through channel 104 toward the fluid outlet 102, whereupon the ball member 106 will engage the valve seat 110 formed on outlet 102 to close communication between the fluid outlet 102 and the output channel 84, thus providing a positive shut-off of any leakage entering the channel 84 from the interaction chamber 78. Ball member 106 will remain seated on valve seat 110 as long as the power stream is directed to the fluid outlet 100.

Thus, the power stream may be selectively directed to either outlet by means of positioning the flapper 96.

It will thus be seen that the present invention provides an electrically actuated fluidic directional control valve capable of directing fluid selectively to a plurality of outlets, which has a minimum of electrical power consumption, and in which its construction has no close clearance sliding fits thus minimizing valve damage; and which provides a fluidic valve which has the low leakage characteristics of a positive shut-off mechanical type valve.

While the form of embodiment of the invention as heredescribed constitutes a preferred form, it is to be understood that other forms might be adapted, all coming within the scope of the claims which follow:

What is claimed is as follows:
1. A fluidic mechanical device comprising:
   (a) a pure fluid logic element having a power stream input channel for defining a power stream, a first output channel having an associated fluid outlet, a second output channel having an associated fluid outlet, each channel defining a path of fluid flow, and an interaction chamber disposed between and communicating with said channels;
   (b) said output channels being divergent with respect to a wedge therebetween which defines a portion of said interaction chamber;
   (c) means for selectively directing said power stream to either of said first and said second output channels;
   (d) a third channel connecting said fluid outlets, said third channel being associated with and in fluid communication with said first and second channels;
   (e) means forming a pressure responsive element movably mounted in said third channel, said movable means being adapted to close communication between one of said fluid outlets and its associated output channel in response to pressure acting thereon when said power stream is being directed through the flow path of the channel associated with the other of said fluid outlets;
   (f) a second pure fluid logic element having a second power stream input channel for defining a second power stream, said second inlet being associated with and in fluid communication with one of said first-mentioned outlets, a fourth output channel having an associated fluid outlet, a fifth output channel having an associated fluid outlet, each channel defining a path of fluid flow, and a second interaction chamber disposed between and in communication with said second-mentioned channels;
   (g) said second-mentioned output channels being divergent with respect to a second wedge therebetween which defines a portion of said second interaction chambers;
   (h) means for selectively directing said second power stream to either of said fourth and fifth output channels;
   (i) a sixth channel connecting said second-mentioned fluid outlets, said sixth channel being associated with and in fluid communication with said fourth and fifth channels; and
   (j) means forming a second pressure responsive element movably mounted in said sixth channel, said second movable means being adapted to close communication between one of said second-mentioned fluid outlets and its associated output channel in response to pressure acting thereon when said second power stream is being directed through the flow path of the channel associated with the other of said second-mentioned fluid outlets.

2. A combination as in claim 1, wherein said first and second pressure responsive movable means each comprise a ball member mounted in said channel associated with each movable means for free transverse rolling motion relative to said associated channel in response to pressure ahead of and beyond said ball member.

(References on following page)

References Cited

UNITED STATES PATENTS

| | | | |
|---|---|---|---|
| 3,124,999 | 3/1964 | Woodward | 137—815 XR |
| 3,168,898 | 2/1965 | Samet | 137—815 XR |
| 3,181,546 | 5/1965 | Boothe | 137—815 |
| 3,282,282 | 11/1966 | Sowers | 137—815 |
| 3,342,392 | 9/1967 | Sowers | 137—815 XR |
| 3,396,631 | 8/1968 | Woodward | 137—815 XR |
| 3,410,291 | 11/1968 | Boothe et al. | 137—815 |

SAMUEL SCOTT, Primary Examiner

U.S. Cl. X.R.

137—608